United States Patent [19]

Tchang et al.

[11] 3,836,817

[45] Sept. 17, 1974

[54] TWO-POLE ELECTRONIC STARTER FOR FLUORESCENT LAMPS

[75] Inventors: Liang-Ing Tchang, Bourg la Reine; Jean Dolezon, Puteaux, both of France

[73] Assignee: Compagnie des Lampes, Paris, France

[22] Filed: Jan. 10, 1973

[21] Appl. No.: 322,358

[52] U.S. Cl. ............ 315/100, 315/DIG. 5, 315/101, 315/104, 315/106, 315/240, 315/245

[51] Int. Cl. .......................................... H05b 41/04

[58] Field of Search.......... 315/DIG. 5, DIG. 7, 100, 315/101, 104, 105, 106, 240, 245

[56] References Cited

UNITED STATES PATENTS 3,457,458 7/1969 Paget et al.................... 315/DIG. 7

*Primary Examiner*—Herman Karl Saalbach
*Assistant Examiner*—James B. Mullins
*Attorney, Agent, or Firm*—Gottlieb, Rackman, Reisman & Kirsch

[57] ABSTRACT

A two-pole electronic starter for use with a fluorescent lamp of the type having filament-like electrodes, for preheating the filament-like electrodes of the fluorescent lamp an thereafter for starting said lamp, said starter comprising a pair of terminals adapted to be electrically connected each to a respective one of the filaments of said fluorescent lamp in order to form with said filaments a series circuit adapted to be electrically connected in turn to a source of alternating current voltage, a bidirectional-conduction electronic switch having a control input and connected between said pair of terminals, and a threshold trigger circuit for delivering control pulses to said control input of said bidirectional-conduction electronic switch, said threshold trigger circuit comprising a threshold diode having one electrode connected to said control input of said electronic switch, a capacitor having one plate connected to the other electrode of said threshold diode, and a voltage divider connected in series across said pair of terminals and provided with an intermediate tap connected to the junction point between said threshold diode and said capacitor, said voltage divider comprising means for shifting the potential of said tap in such a direction that at each half-wave of the supply a.c. voltage, after a predetermined time period for which the voltage applied to the fluorescent lamp is normally sufficient for starting same, becomes lower than the threshold level of said threshold diode in order to keep said electronic switch in a non-conducting state.

13 Claims, 7 Drawing Figures

TWO-POLE ELECTRONIC STARTER FOR FLUORESCENT LAMPS

BACKGROUND OF THE INVENTION.

The present invention relates to a two-pole electronic starter for use with a fluorescent lamp of the type having filament-like electrodes, for preheating the filament-like electrodes of the fluorescent lamp and thereafter for starting said lamp, said starter comprising a pair of terminals, each adapted to be electrically connected to a respective one of the filaments of the fluorescent lamp in order to constitute with said filaments a series circuit adapted to be connected in turn to a source of alternating current.

To ensure the ignition of a fluorescent lamp under satisfactory conditions, that is, with the maximum efficiency and without damaging the lamp filaments or reducing its useful life, it is necessary to preheat the filaments and then applying thereto during a very short time, a voltage sufficient for striking an arc between the lamp electrodes.

SUMMARY OF THE INVENTION

It is the essential object of the present invention to provide a two-pole slectronic starter of the above defined type, capable of performing the above- disclosed function while permitting a quick ignition or start of the fluorescent lamp with which it is associated, irrespective of the lamp type concerned and without resorting to preheating windings in the supply ballast which is usually connected in series with the fluorescent lamp.

To this end, the two-pole electronic starter according to this invention is characterized in that it comprises, between its two terminals, a bidirectional conduction electronic switch and a threshold trigger circuit for delivering control pulses to a control input of the bidirectional-conduction electronic switch, the threshold trigger circuit comprising essentially a threshold diode having one electrode connected to said electronic switch control input and an other electrode connected to one plate of a capacitor which plate is connected in turn to an intermediate tap of a voltage divider which is connected between the two terminals of said starter and constitutes a charging circuit and a discharge circuit for said capacitor, and in that said voltage divider comprises means for shifting the potential of said intermediate tap in such a direction that the voltage whereat said capacitor is charged at each half-wave of the a.c. supply voltage, after a predetermined time period for which the voltage applied to the fluorescent lamp is normally sufficient for starting same, becomes lower than the threshold level of the threshold diode, in order to keep said electronic switch in a non-conducting state.

With this arrangement, when an ON-OFF switch inserted in the supply circuit of the fluorescent lamp is closed, the bidirectional conduction electronic switch, which may advantageously consist of a triac, is firstly controlled in a manner to cause said switch to assume its conducting state during at least a certain time period upon each half-wave of the a.c. supply voltage, in order to permit the passage of heating current through the filaments of the fluorescent lamp, this condition being maintained during a predetermined time period after the closing of said ON-OFF switch, whereafter the electrodes of the fluorescent lamp are heated sufficiently to cause the starting thereof. At the end of this predetermined time period, the triac stops conducting and two possibilities arise: either the fluorescent lamp is started and the arc struck between its electrodes shunts the starter so that the latter remains inoperative, or the fluorescent lamp is not started and another preheating cycle begins for restoring the lamp starting conditions, until the fluorescent lamp is actually lighted.

BRIEF DESCRIPTION OF THE DRAWINGS.

A detailed description of various forms of embodiment of the present invention will now be given by way of example with reference to the attached drawings, in which.

DESCRIPTION OF THE PREFERRED EMBODIMENTS.

Figure 1:
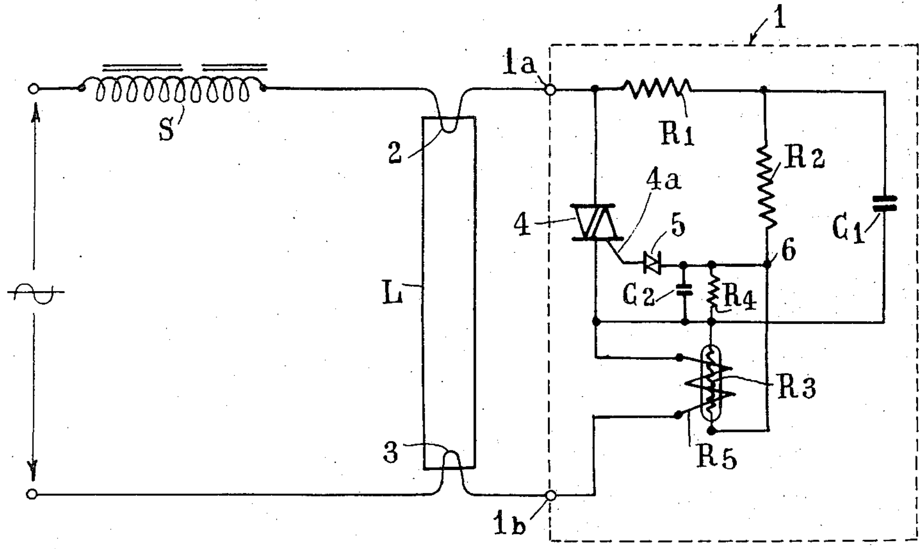
FIG. 1 is a wiring diagram of a fluorescent lamp equipped with a two-pole electronic starter according to a first embodiment of the present invention.

The two-pole electronic starter 1 illustrated in FIG. 1, intended for starting a fluorescent lamp L, comprises a pair of terminals 1*a* and 1*b* connected to the filament-like electrodes 2 and 3 of the fluorescent lamp L, respectively, so as to constitute with these filaments a series circuit adapted in turn to be connected to a source of alternating current (not shown), via a stabilizing choke or ballast S and an usual ON-OFF switch (not shown).

According to this invention, the two-pole electronic starter 1 comprises across its terminals 1*a* and 1*b* a bidirectional electronic switch advantageously consisting of a triac 4, and a threshold-type trigger circuit for delivering a control pulse to the gate electrode 4*a* of said triac 4. This threshold type trigger circuit comprises essentially a threshold diode such as a diac 5 having one electrode connected to the gate electrode 4*a* of said triac and its other electrode connected to one of the plates of a capacitor $C_2$ having its other plate connected to the common electrode of said triac. The first-mentioned plate of capacitor $C_2$ is connected to a tap 6 of a voltage divider which is fed from the a.c. source and constitutes a charging circuit and a discharge circuit for capacitor $C_2$. In the embodiment illustrated in FIG. 1 this voltage divider comprises on the one hand a pair of resistors $R_1$ and $R_2$ mounted in series between the terminal 1*a* of the starter and tap 6, to constitute the charging circuit of capacitor $C_2$, and on the other hand another pair of resistors $R_3$ and $R_4$ constituting a parallel circuit mounted in turn in parallel to capacitor $C_2$.

According to a specific feature characterizing this invention, the voltage divider comprises means for causing the potential of said tap 6 to shift in such direction that the voltage whereat said capacitor $C_2$ is charged at each half-wave of the a.c. supply voltage after a predetermined time period for which the voltage fed to the fluorescent lamp L is normally sufficient to start same, becomes lower than the threshold level of diac 5. This means may consist for example of resistor $R_3$ which can be a resistor of the type having a negative temperature coefficient, disposed in proper heat-transfer relationship with a heating resistor $R_5$ connected in series with triac 4 across the starter terminals 1*a* and 1*b*.

A capacitor $C_1$ having a function to be explained presently is connected in parallel to said triac 4. More particularly, one of the plates of this capacitor $C_1$ is connected to the common electrode of triac 4, and its other plate is connected to the junction point of resistors $R_1$ and $R_2$, so that in fact it is the series circuit comprising the resistor $R_1$ and capacitor $C_1$ that is connected in parallel to said triac 4.

The above-described electronic starter operates as follows. When at a given time $t_0$ (FIG. 2) the main switch provided in the supply circuit of lamp L is closed, the threshold trigger circuit of triac 4 is energized. When for each half-wave of the a.c. supply voltage the voltage across the terminals of capacitor $C_2$ becomes higher than the threshold level of diac 5, the latter delivers to the gate electrode 4a of triac 4 a trigger pulse causing this triac to assume its conducting state. Thus, heating current flows through the filaments 2 and 3 of fluorescent lamp L. This heating current also flows through resistor $R_5$ provided for heating resistor $R_3$ having a negative temperature coefficient. Consequently, the resistance value of resistor $R_3$ decreases and may thus drop to a value such that the voltage across the terminals of capacitor $C_2$ becomes lower than the threshold level of diac 5, whereby the triac 4 becomes non-conducting. This change in the mode of operation of the circuit leads to the production of an oscillatory overvoltage in the oscillating circuit comprising the stabilizing choke S and capacitor $C_1$. As a result, a pulse is generated and applied to the electrodes of the fluorescent lamp L. By properly calculating the different values of the circuit component elements, it is possible to cause said change (in the mode of operation) to take place at a predetermined time $t_1$ after the moment $t_0$ (FIG. 2), the time period $t_1$–$t_0$ being both long enough to allow the filaments 2 and 3 of lamp L to be properly heated and short enough to produce a rapid starting or ignition of said lamp, and to cause the cut-off overvoltage produced at said time $t_1$ and applied across the terminals of lamp L to be of a sufficient magnitude to start this lamp. The function of resistor $R_4$ is to prevent the starter from resuming its operation once the lamp L has been lighted. More particularly, the value of said resistor $R_4$ is so selected that after the starting of lamp L, as the electric arc struck across the lamp electrodes is substantially shunting or by-passing the electronic starter 1, the voltage then appearing across the ends of said resistor $R_4$ and applied to capacitor $C_2$ remains under all circumstances lower than the threshold voltage of diac 5. The function of resistor $R_1$ is to reduce the time necessary for the current flowing through the triac to build up.

Figure 2:
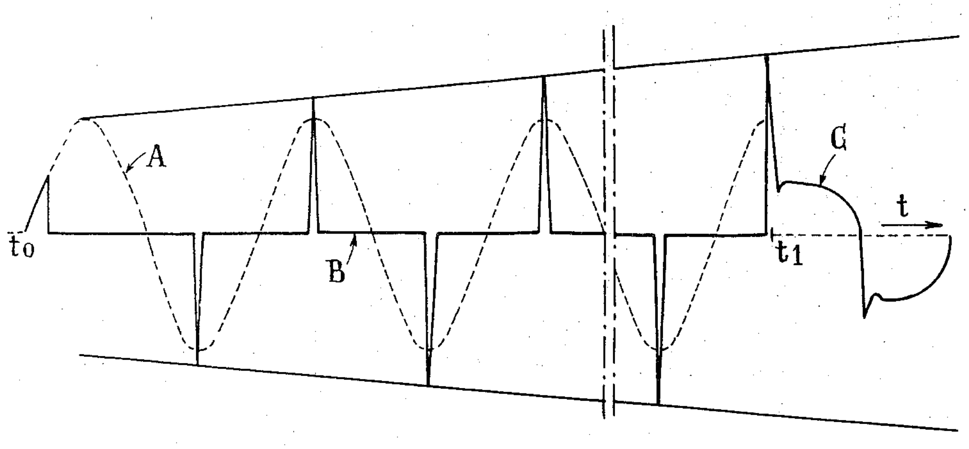
FIG. 2 is a diagram showing the pattern of the voltage osciallations across the terminals of the fluorescent lamp during an attempt of starting the lamp.

FIG. 2 illustrates the evolution of the operation of the electronic starter 1 during a complete attempt to start a fluorescent lamp L. In this Figure, A designates the waveform of the a.c. supply voltage, B is the waveform of the voltage across the triac terminals during the time period corresponding to the heating of filaments 2 and 3, and C is the waveform of the arc voltage of the lamp after the latter has been started at time $t_1$. As shown in FIG. 2, when the main switch (not shown) inserted in the supply circuit of lamp L is closed, the triac is rendered conducting by the mains voltage fed to the threshold trigger circuit via the stabilizing choke S and the filaments 2 and 3 of lamp L. At the triac cut-off during the first halfwave of the a.c. supply voltage, when the momentary value of the heating current is zero, the a.c. supply voltage being substantially at its peak value, the series oscillating circuit comprising said stabilizing choke S and capacitor $C_1$ begins to oscillate freely. The above-described threshold trigger circuit is so designed that at each half-wave the triac is rendered conducting by the oscillating overvoltage, not by the sine wave of the a.c. supply voltage. The natural frequency of the oscillating condition must then be low enough to prevent the impedance of capacitor $C_2$ from becoming abnormally low at said frequency. As the negative temperature coefficient resistor 3 is heated by resistor $R_5$, its ohmic value decreases at each half-wave of the a.c. supply voltage.

As a consequence of this reduction in the ohmic value of resistor $R_3$, the momentary value of the oscillating voltage to be fed to the trigger circuit of the triac for bringing this triac to the conducting state increases at each half-wave until, for a certain half-wave, it reaches a value approximating the peak value of this oscillating voltage before the triac is turned-off. During this last half-wave, the transitory voltage resulting from the triac cut-off at time $t_1$ will be the pulse having the greatest amplitude during a cycle of operation of the starter, and the pulse is applied across the terminals of the fluorescent lamp for starting it.

If at the end of this first cycle of operation the fluorescent lamp is not started or lighted, the starter is stopped to permit the cooling of resistor $R_3$, and then the same cycle is repeated as many times as required for starting the lamp. Thus, at each attempt to start the lamp, the lamp filaments are pre-heated and this preheating is obtained by virtue of the triac inserted in series with the lamp filaments and so controlled as to be recurrently conducting during a predetermined time period.

In case the fluorescent lamp were de-activated, the starter would operate as in the preceding case, that is, in a relaxation mode. Thus, the average current flowing through the stabilizing choke S and through the triac 4 will be very low and any risk of abnormally heating this choke of said triac will safely be precluded.

The above-described electronic starter is of completely static and thermo-controlled character. Therefore, no mechanical adjustment is required during its manufacture, and the risk of damaging movable contacts is definitely precluded since the device is free of any contact whatsoever. This feature is particularly advantageous in comparison with conventional starters incorporating a bimetallic strip. The electronic starter according to the present invention is attended by many other advantageous features, inter alia:

1. by acting on the heating resistor $R_5$, i.e., on its ohmic value or its position in relation to the negative-temperature coefficient resistor $R_3$, it is possible to adjust the heating time and therefore the time required for starting the fluorescent lamp. 2. in case the fluorescent lamp failed to light up, notably if one of its filaments were broken, the starter operation will be stopped immediately. 3. the fluorescent lamp cannot be lighted if its filaments have not been pre-heated sufficiently (and provided however that the heating time has been properly determined), thus ensuring an improved behaviour of the fluorescent lamps equipped with an electronic starter according to this invention, from the point of view of repeated ignitions, which are of the order of 100,000 ignitions (instead of about 40,000 in the case of a conventional glow-type starter). 4. the electronic starter according to this invention can be used with a capacitive stabilizing circuit for fluorescent lamp. The starting time and the number of ignitions of the lamp are therefore independent of the specific nature of the stabilizing circuit. 5. the same starter circuit diagram may be used for fluorescent lamps of different power ratings supplied with different voltages. Thus, for the various current ranges it is only necessary to change the ohmic value of the heating resistance $R_5$, and for the different voltage ranges it is only necessary to modify the ohmic value of resistor $R_2$.

By way of non-limiting exemplary illustration and considering the starting of a 215-Watt fluorescent lamp supplied from a 380-VOlt mains, an electronic starter of the type illustrated in FIG. 1 was used; the component elements of this starter had the following values, respectively:

| | |
|---|---|
| Triac | 4.5 Amp., 800 V |
| Capacitor $C_1$ | 33 nF, 1,000 V |
| Capacitor $C_2$ | 22 nF, 250 V |
| Resistor $R_1$ | 100 Ohms, 1 Watt |
| Resistor $R_2$ | 100 kiloohms, 1 Watt |
| Resistor $R_3$ | N T C 150 kiloohms |
| Resistor $R_4$ | 24 kiloohms, 0.5 Watt |
| Resistor $R_5$ | 0.8 ohm. |

Figure 3:
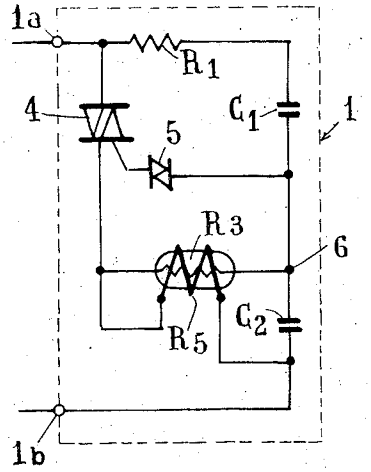
FIGS. 3 to 5 are other wiring diagrams illustrating modifications of the embodiment of the two-pole electronic starter illustrated in FIG. 1.
Figure 4:
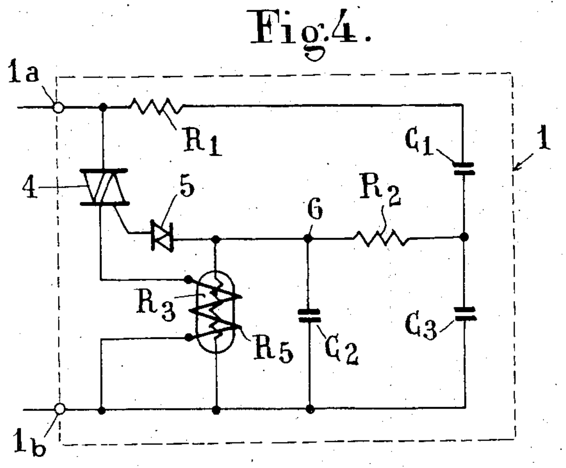
Figure 5:
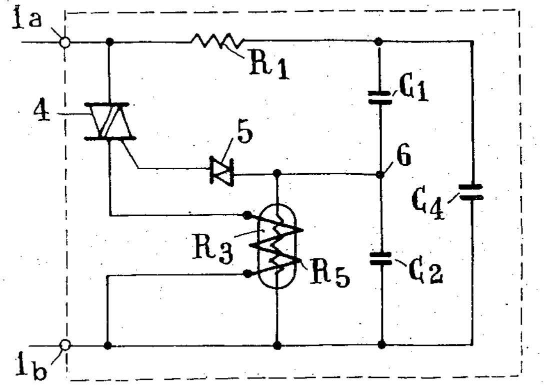

FIGS. 3 to 5 inclusive illustrate modified embodiments of the electronic starter according to this invention.

The modified embodiment illustrated in FIG. 3 differs from the circuit of FIG. 1 in that resistor $R_2$ is eliminated and the voltage divider comprises in this case on the one hand a resistor $R_1$ and a capacitor $C_1$ mounted in series across terminal 1*a* and tap 6, and on the other hand the negative temperature coefficient resistor $R_3$ and heating resistor $R_5$ mounted in series, this series mounting being connected in turn in parallel to capacitor $C_2$. This capacitor $C_2$ has its plate opposite to that connected to the tap 6 connected to terminal 1*b*, and the junction point between resistor $R_3$ and resistor $R_5$ is connected to the common electrode of triac 4. In this midified embodiment, due to the moderate resistance value of resistor $R_5$, it is admitted that resistor $R_3$ is also in this case mounted in parallel to capacitor $C_2$ in order to determine the voltage applied thereto and therefore the voltage applied to diac 5.

The modified embodiment illustrated in FIG. 4 differs from that shown in FIG. 1 in that the voltage divider consists in this case on the one hand of resistor $R_1$, capacitor $C_1$ and resistor $R_2$ mounted in series between terminal 1*a* and tap 6, and on the other hand, of the negative temperature coefficient resistor $R_3$ connected in parallel to capacitor $C_2$ having its plate opposite to that connected to said tap 6 connected to terminal 1*b*. A capacitor $C_3$ is connected in parallel to the series circuit comprising resistor $R_2$ and capacitor $C_2$. Also in this case the negative temperature coefficient resistor $R_3$ permits of determining the voltage across the terminals of capacitor $C_2$.

The modified embodiment of FIG. 5 differs from that shown in FIG. 3 in that the negative temperature coefficient resistor $R_3$ is connected directly in parallel to capacitor $C_2$, without passing through the heating resistor $R_5$, and that a capacitor $C_4$ is connected in parallel to the series circuit comprising the pair of capacitors $C_1$ and $C_2$. Also in this case the negative temperature coefficient resistor $R_3$ permits of determining the voltage across the terminals of capacitor $C_2$.

The operation of the electronic starters according to the various embodiments illustrated in FIG. 3 to 5 is substantially the same as that of the starter shown in FIG. 1. In all cases, the negative temperature coefficient resistor $R_3$ permits of shifting the potential of the tap 6 in such direction that after a predetermined time period following the closing of a switch inserted in the supply circuit or mains circuit of the lamp, the voltage across the terminals of capacitor $C_2$ becomes lower than the threshold voltage of diac 5 in order to maintain the triac 4 in the non-conducting state.

Although the form of embodiment of the electronic starter described with reference to FIG. 1 and its various modifications described with reference to FIG. 3 to 5 are applicable to the starting of high-power fluorescent lamps, supplied from the 380-Volt mains, the triac used for this purpose must be particularly powerful and capable of withstanding a relatively high maximum peak voltage. Such triacs are relatively expensive and in this case a preferred solution may consist in utilizing an electronic starter comprising, according to a second embodiment of this invention, a second bidirectional-conduction electronic switch mounted in series with the first bidirectional-conduction electronic switch, and a second threshold-type trigger circuit for this second electronic switch, the capacitor of the first threshold-type trigger circuit and the means provided for shifting the potential (i.e., the voltage across the terminals of this capacitor) being common to both threshold-type trigger circuits.

This second embodiment will now be described with reference to FIG. 6 and 7 of the drawings in which the same reference numerals as in FIG. 1 are used for designating similar elements, or elements having the same function as in the first embodiment illustrated in FIG. 1. As in the first embodiment, the two-pole electronic starter illustrated in FIG. 6 comprises a bidirectional-conduction electronic switch consisting, for example, of a triac 4A, and a threshold-type trigger circuit for delivering a control or trigger pulse to the gate electrode of said triac 4A. This threshold trigger circuit comprises essentially a threshold diode such as a diac 5A, having one electrode connected to the gate electrode of triac 4A and its other electrode connected to one of the plates of a capacitor $C_2$. This plate of capacitor $C_2$ is also connected to a tap 6A of a voltage divider comprising means for shifting the potential of said tap point 6A in a direction such that the voltage at which the capacitor $C_2$ is charged at each half-wave of the a.c. supply voltage, after a predetermined time period for which the voltage applied to the fluorescent lamp L is normally sufficient to start same, becomes lower to the threshold voltage of diac 5A. This means may consist for example of a resistor $R_3$ of the negative temperature coefficient type, connected in parallel to said capacitor $C_2$ and disposed in heat-transfer relationship with a heating resistor $R_5$ connected in series to said triac 4A.

Figure 6:
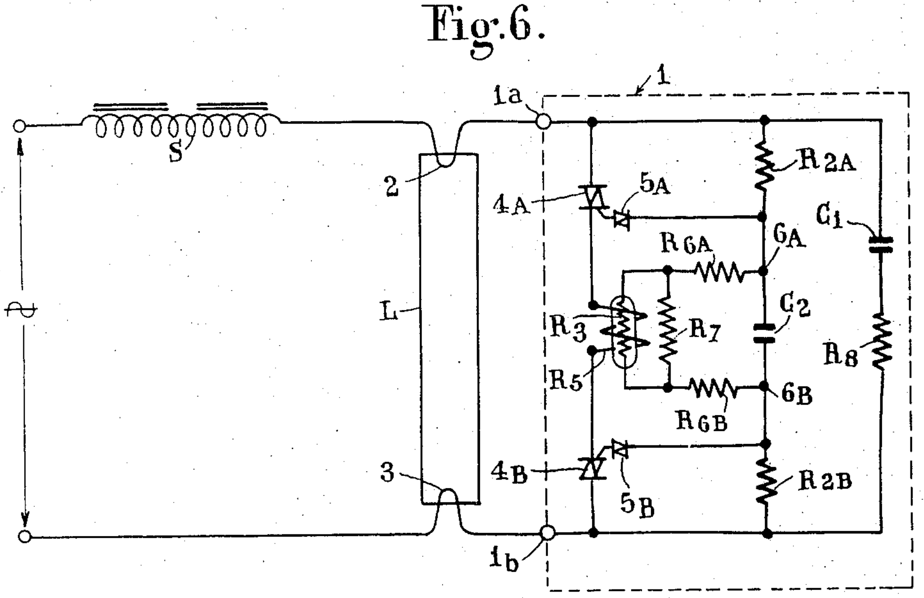
FIG. 6 is a wiring diagram of a fluorescent lamp equipped with a two-pole electronic starter according to another embodiment of this invention.

The two-pole electronic starter illustrated in FIG. 6 further comprises a second bidirectional-conduction electronic switch consisting for example of a second triac 4B, and a second threshold trigger circuit identical with the first threshold trigger circuit, for delivering control pulses to the gate electrode of the second triac 4B; moreover the capacitor $C_2$, the negative temperature coefficient resistor $R_3$ and the heating resistor $R_5$ are common to both threshold trigger circuits. The threshold diode, such as a diac 5B, of the second threshold trigger circuit, is connected between the gate electrode of triac 4B and the other plate of capacitor $C_2$.

Both triacs 4A and 4B are mounted in opposition with the heating resistor $R_5$ interconnected therebetween, the pair of triacs and the heating resistor constituting a series circuit connected across the starter terminals 1*a* and 1*b*. The negative temperature coefficient resistor $R_3$ is connected in parallel to another resistor $R_7$, the parallel circuit thus obtained being connected in turn, in series, with a pair of resistors $R_{6A}$ and $R_{6B}$, between these two resistors, the resulting series circuit unit being connected in turn in parallel to capacitor $C_2$. The values of resistors $R_3$, $R_{6A}$, $R_{6B}$ and $R_7$ are selected to cause the equivalent resistance of the above-mentioned series circuit to have such a value that, when the fluorescent lamp L has been lighted the voltage whereat the capacitor $C_2$ is charged at each half-wave of the a.c. supply voltage remains lower than the threshold voltage of diacs 5A and 5B in order to keep both triacs 4A and 4B in the non-conducting state.

The voltage dividers included in the two threshold trigger circuits are completed by a resistor $R_{2A}$ connected between junction point 6A and terminal 1*a*, and by a resistor $R_2$ connected between junction point 6B and terminal 1*b*. Moreover, a capacitor $C_1$ and a resistor $R_2$ are connected in series between the starter terminals 1*a* and 1*b*.

The mode of operation of the electronic starter illustrated in FIG. 6 is substantially the same as that of the one shown in FIG. 1; therefore, a detailed description of this mode of operation is not deemed necessary.

Figure 7:
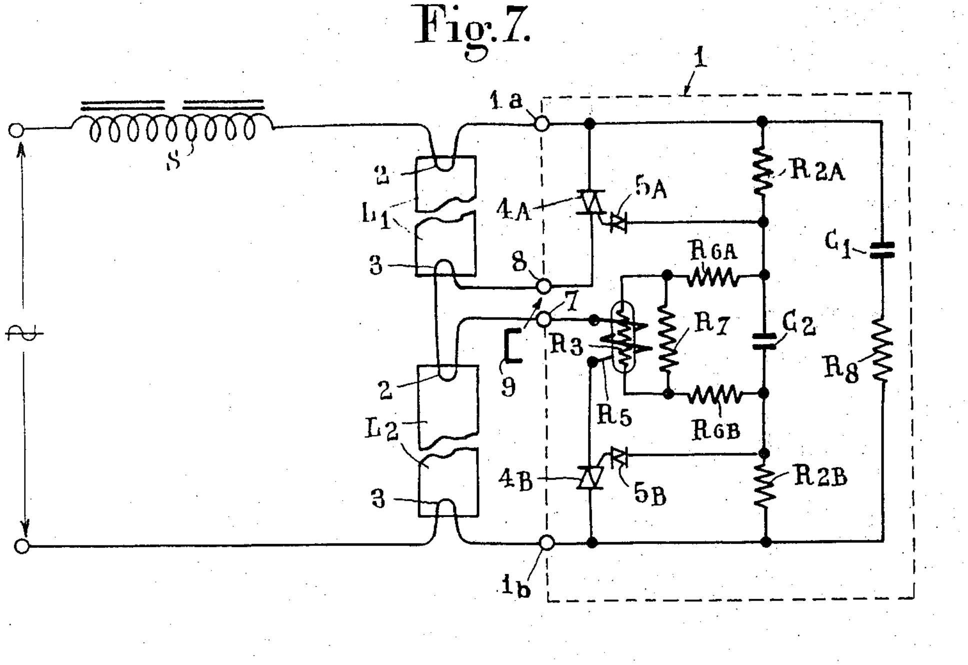
FIG. 7 is a wiring diagram illustrating a modification of the embodiment of the electronic starter of FIG. 6, for starting two fluorescent lamps disposed in series.

FIG. 7 shows a modified embodiment of the arrangement shown in FIG. 6. In this modified embodiment the heating resistor $R_5$ is not connected directly to the common electrode of triac 4A but to an auxiliary terminal 7, and the common electrode of triac 4A is connected to another auxiliary terminal 8. Both auxiliary terminals 7 and 8 may be selectively interconnected either through a removable short-circuit member such as a connecting strip 9 (in this case the resultant circuit diagram is equivalent to the circuit diagram illustrated in FIG. 6), or through the series-connected relevant filaments 3 and 2 of a pair of fluorescent lamps $L_1$ and $L_2$ connected in series across the two main terminals 1*a* and 1*b* of the starter. Thus, by bringing but a very simple modification of the circuit illustrated in FIG. 6, i.e., by adding the two auxiliary terminals 7 and 8, and the removable short-circuit member 9, it is possible to obtain an electronic starter adapted to be operated either for lighting a single fluorescent lamp connected across terminals 1*a* and 1*b*, in which case the short-circuit member 9 is connected or plugged in across the auxiliary terminals 7 and 8, or for starting a pair of fluorescent lamps $L_1$ and $L_2$ mounted in series, the short-circuit member 9 being removed and the filaments 2, 3 of lamp $L_1$ being connected to terminal 1*a* and auxiliary terminal 8, respectively, whereas the filaments 2 and 3 of fluorescent lamp $L_2$ are connected to the auxiliary terminal 7 and terminal 1*b*, respectively, and filament 3 of lamp $L_1$ and filament 2 of lamp $L_2$ being connected in series.

Of course, the various embodiments described hereinabove are given by way of illustration only and should not be construed as limiting the field of the present invention, since many modifications may be brought thereto without departing from the basic principles of the invention as set forth in the appended claims. Thus, notably, other means may be used for shifting the potential of tap point 6 in the manner mentioned hereinabove. For instance, instead of the negative temperature coefficient resistor $r_3$, a resistor having a fixed ohmic value may be used, and in lieu of the fixed ohmic value resistor $R_2$ of FIG. 1, a positive temperature coefficient resistor arranged in heat transfer relationship to the heating resistor $R_5$ may be contemplated.

What we claim is:

1. A two-pole electronic starter for use with a fluorescent lamp of the type having filament-like electrodes, for preheating the filament-like electrodes of the fluorescent lamp and thereafter for starting said lamp, said starter comprising a pair of terminals adapted to be electrically connected each to a respective one of the filaments of said fluorescent lamp in order to form with said filaments of said fluorescent lamp in order to form with said filaments a series circuit adapted to be electrically connected in turn to a source of alternating current voltage, a bidirectional-conduction electronic switch having a control input and connected between said pair of terminals, and a threshold trigger circuit for delivering control pulses to said control input of said bidirectional-conduction electronic switch, said threshold trigger circuit comprising a threshold diode having one electrode connected to said control input of said electronic switch, a capacitor having one plate connected to the other electrode of said threshold diode, and a voltage divider connected in series across said pair of terminals and provided with an intermediate tap connected to the junction point between said threshold diode and said capacitor, said voltage divider comprising means for shifting the potential of said tap in such a direction that at each half-wave of the supply a.c. voltage, after a predetermined time period for which the voltage applied to the fluorescent lamp is normally sufficient for starting same, becomes lower than the threshold level of said threshold diode in order to keep said electronic switch in a non-conducting state.

2. Electronic starter as set forth in claim 1, wherein said means consists of a negative temperature coefficient resistor connected in parallel to said capacitor and arranged in heat transfer relationship with a heating resistor connected in turn in series to said electronic switch.

3. Electronic starter as set forth in claim 2, wherein said negative temperature coefficient resistor and the heating resistor associated therewith are connected in series, the series circuit thus obtained being connected in turn in parallel to said capacitor, a junction point between said negative temperature coefficient resistor and said heating resistor being connected to said electronic switch.

4. Electronic starter as set forth in claim 1, wherein said bidirectional conduction electronic switch comprises a triac having a gate electrode, and said threshold diode consists of a diac having one electrode connected to said gate electrode and another electrode connected to one plate of the capacitor of said threshold trigger circuit.

5. Electronic starter as set forth in claim 1, further comprising an impedance connected in parallel to said capacitor, said impedance being of such a value that, after the fluorescent lamp has been started, the voltage whereat said capacitor is charged at each half-wave of the supply a.c. voltage remains lower than the threshold voltage of said threshold diode in order to keep said electronic switch in the non-conduction state.

6. Electronic starter as set forth in claim 5, wherein said impedance is a resistor.

7. Electronic starter as set forth in claim 1, wherein said voltage divider comprises at least one resistor having a resistance value which is so selected to limit the time necessary for the current flowing through said electronic switch to build up.

8. Electronic starter as set forth in claim 1, further comprising another capacitor connected in parallel to said electronic switch, said other capacitor being adapted when said starter is in operation, to constitute together with a stabilizing coil connected in series with said fluorescent lamp, a series oscillating circuit capaable of producing at each half-wave of said supply a.c. voltage and before starting the lamp, an oscillating overvoltage usable for controlling the conduction state of said electronic switch.

9. Two-pole electronic starter as set forth in claim 1, further comprising a second bidirectional-conduction electronic switch mounted in series with said first bidirectional-conduction electronic switch and having a control input, and a second threshold trigger circuit for delivering control pulses to the control input of said second electronic switch, said second threshold trigger circuit comprising a second threshold diode having one electrode connected to said control input of said second electronic switch, the capacitor of the first threshold trigger circuit having its other plate connected to the other electrode of said second threshold diode, the voltage divider having a second tap connected to the junction point between the capacitor and the second threshold diode, the potential shifting means being connected between the two taps of the voltage divider.

10. Two-pole electronic starter as set forth in claim 9, wherein said first and second bidirectional-conduction electronic switches consist of triacs mounted in series and in opposition, and said means consists of a negative temperature coefficient resistor connected in parallel to said capacitor and arranged in heat transfer relationship with a heating resistor, said heating resistor being connected in series between said pair of triacs.

11. Two-pole electronic starter as set forth in claim 10, wherein said heating resistor and one of said pair of triacs are each connected to an auxiliary terminal of said starter, said auxiliary terminals being adapted to be connected to each other selectively through a removable short-circuit member or through relevant filaments, connected in series, of a pair of fluorescent lamps mounted in series across the pair of main terminals of said starter.

12. Two-pole electronic starter as set forth in claim 10, comprising a series circuit connected in parallel to said capacitor and consisting of a first resistor, of a parallel circuit and of a second resistor connected in series in this order, said parallel circuit comprising a third resistor in parallel to said negative temperature coefficient resistor, said series circuit having such an equivalent resistance value that when the fluorescent lamp has been started the voltage whereat said capacitor is charged at each half-wave of said supply a.c. voltage remains lower that the threshold voltage of said threshold diodes of the two threshold trigger circuits in order to keep both electronic switches in the non-conducting state.

13. Two-pole electronic starter as set forth in claim 11, which comprises a series circuit connected in parallel to said capacitor and consisting of a first resistor, of a parallel circuit and of a second resistor connected in series in this order, said parallel circuit comprising a third resistor in parallel to said negative temperature coefficient resistor, said series circuit having such an equivalent resistance value that after the fluorescent lamp has been started the voltage whereat said capacitor is charged at each half-wave of the supply a.c. voltage remains lower than the threshold voltage of the threshold diodes of the two threshold trigger circuits in order to keep both electronic switches in the non-conducting state.

* * * * *